(12) United States Patent
John et al.

(10) Patent No.: US 9,007,207 B2
(45) Date of Patent: Apr. 14, 2015

(54) DYNAMIC ALARM SYSTEM FOR OPERATING A POWER PLANT AND METHOD OF RESPONDING TO SAME

(71) Applicant: General Electric Company, Schenectady, NY (US)

(72) Inventors: Justin Varkey John, Cohoes, NY (US); Robert William Grubbs, Blue Ridge, VA (US); Jonathan Carl Thatcher, Pendleton, SC (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 13/746,507

(22) Filed: Jan. 22, 2013

(65) Prior Publication Data

US 2014/0203934 A1 Jul. 24, 2014

(51) Int. Cl.
*G08B 21/00* (2006.01)
*G08B 23/00* (2006.01)
*G05B 23/02* (2006.01)

(52) U.S. Cl.
CPC .......... *G08B 23/00* (2013.01); *G05B 23/0272* (2013.01)

(58) Field of Classification Search
CPC ......... G08B 23/00; G08B 25/00; G08B 25/02
USPC ......................................................... 340/540
See application file for complete search history.

(56) References Cited

U.S. PATENT DOCUMENTS

| | | | | |
|---|---|---|---|---|
| 5,955,946 A | * | 9/1999 | Beheshti et al. | 340/506 |
| 6,492,901 B1 | * | 12/2002 | Ridolfo | 340/506 |
| 2002/0193969 A1 | * | 12/2002 | Frantz et al. | 702/188 |
| 2003/0028274 A1 | * | 2/2003 | Powell | 700/95 |
| 2009/0012631 A1 | | 1/2009 | Fuller | |
| 2009/0201144 A1 | * | 8/2009 | Okada | 340/506 |
| 2011/0010654 A1 | * | 1/2011 | Raymond et al. | 715/772 |

FOREIGN PATENT DOCUMENTS

WO 2011116340 A2 9/2011

* cited by examiner

*Primary Examiner* — Kerri McNally
(74) *Attorney, Agent, or Firm* — Cantor Colburn LLP

(57) ABSTRACT

A dynamic alarm system for operating a power plant is disclosed. The dynamic alarm system includes a sensor configured to generate a signal related to a measurement of an operation of the power plant. An interface displays a generated alarm to an operator and receives a dynamic rating value from the operator related to the generated alarm. A processor generates the alarm using the generated signal, compiles the rating value and alters an operation of the power plant from the compiled rating value.

20 Claims, 4 Drawing Sheets

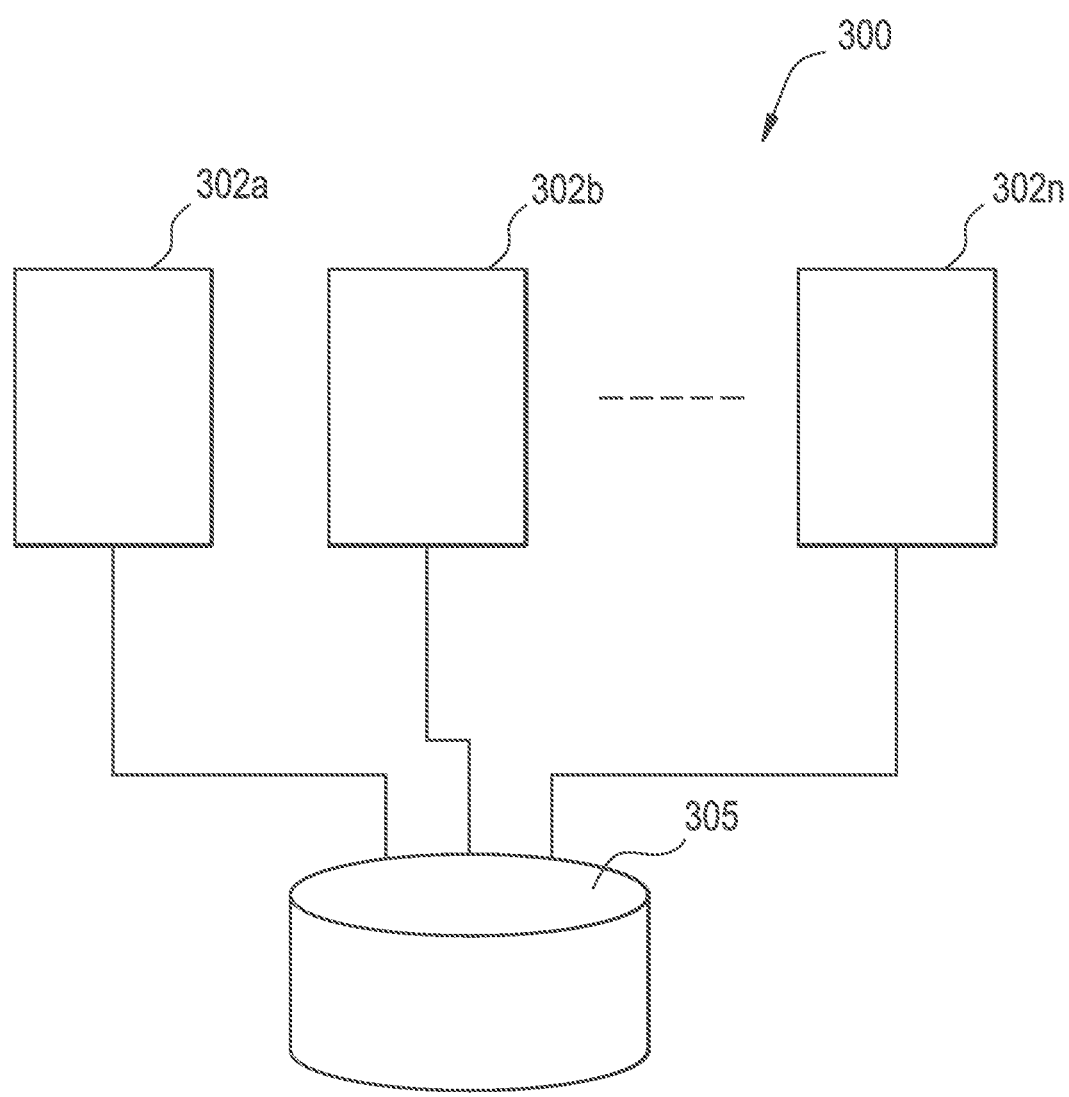

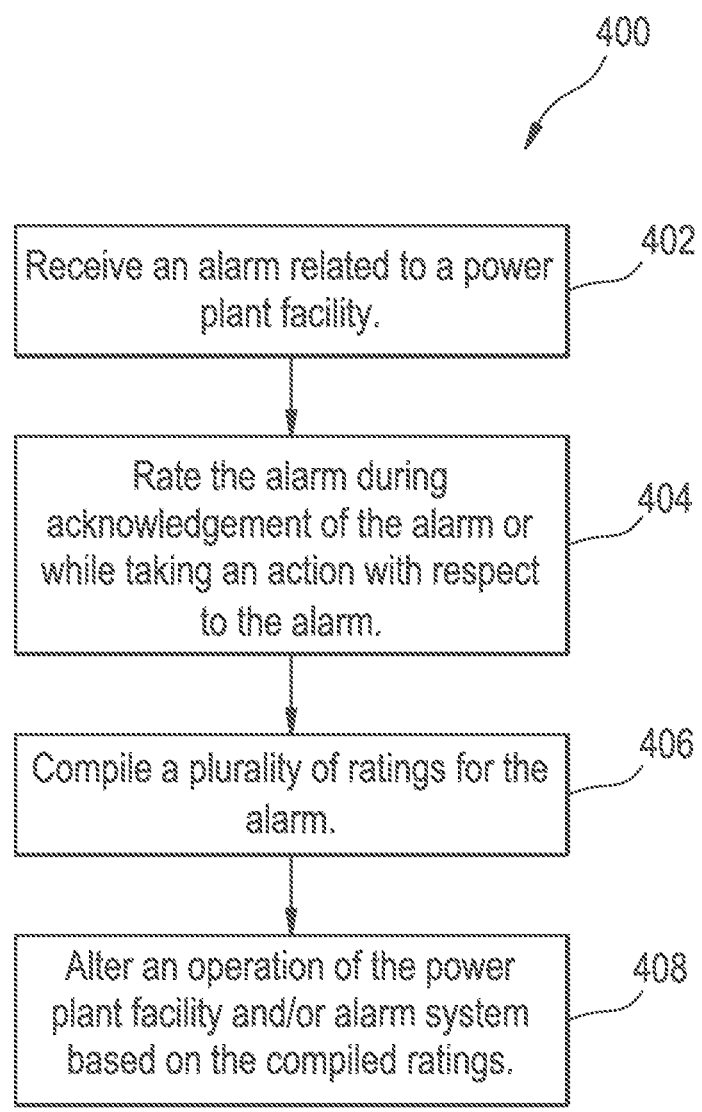

DYNAMIC ALARM SYSTEM FOR OPERATING A POWER PLANT AND METHOD OF RESPONDING TO SAME

BACKGROUND OF THE INVENTION

The subject matter disclosed herein relates to power plant operation and in particular to responding to alarms that are triggered during operation of the power plant.

Power plants generally include a number of machines that are operated to produce power or electricity. These machines may include a number of sensors that monitor components of the machines or operating parameters in order to ensure their proper operation. When a particular operating parameter falls outside of a preselected range, a set of logic will send an alarm to a control unit in order to alert an operator working at the control unit. Often, the plant developers do not have the benefit of observing mature operation of the power plant whereas the plant operator does, and no efficient mechanism exists to allow the operator's experience to improve future designs. Also, some of the alarms may be more critical to operation of the power plant than others. However, currently an alarm may be presented to the operator with the same level of urgency as any other alarm or may be assigned an alarm priority when alarm is designed. There is no way for the operator to categorize an alarm that increases the effectiveness of the operator in operating the power plant or to collect quantitative data related to the alarm for use in plant operation or plant development.

BRIEF DESCRIPTION OF THE INVENTION

According to one aspect of the invention, a dynamic alarm system for operating a plant is provided that includes: a sensor configured to generate a signal related to a measurement of an operation of the plant; an interface configured to display a generated alarm to an operator and receive a dynamic rating value related to the generated alarm from the operator; and a processor configured to: generate the alarm using the generated signal, compile the rating value, and alter an operation of the plant from the compiled rating value.

According to another aspect of the invention, a method of responding to an alarm at a power plant is provided that includes: receiving one or more alarms related to an operation of the power plant; dynamically rating the one or more alarms to obtain one or more rating values; compiling the one or more rating values; determining a relevance of a selected alarm to the operation of the power plant from the compiled rating values; and altering an operation of the power plant using the determined relevance.

According to yet another aspect of the invention, an apparatus for responding to an alarm at a plant is provided that includes: a control panel configured to receive one or more alarms related to an operation of the plant; an interface configured to receive a dynamically selected rating value related to the one or more alarms; and a processor configured to: compile the dynamically selected rating values, determine a relevance of a selected alarm to operation of the plant from the compiled rating values, and alter an operation of the plant from the determined relevance.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 shows a system of power plant facilities that may operate use the exemplary alarm system disclosed herein; and FIG. 4 shows a flowchart illustrating an exemplary method of responding to an alarm.

The detailed description explains embodiments of the invention, together with advantages and features, by way of example with reference to the drawings.

DETAILED DESCRIPTION OF THE INVENTION

Figure 1:
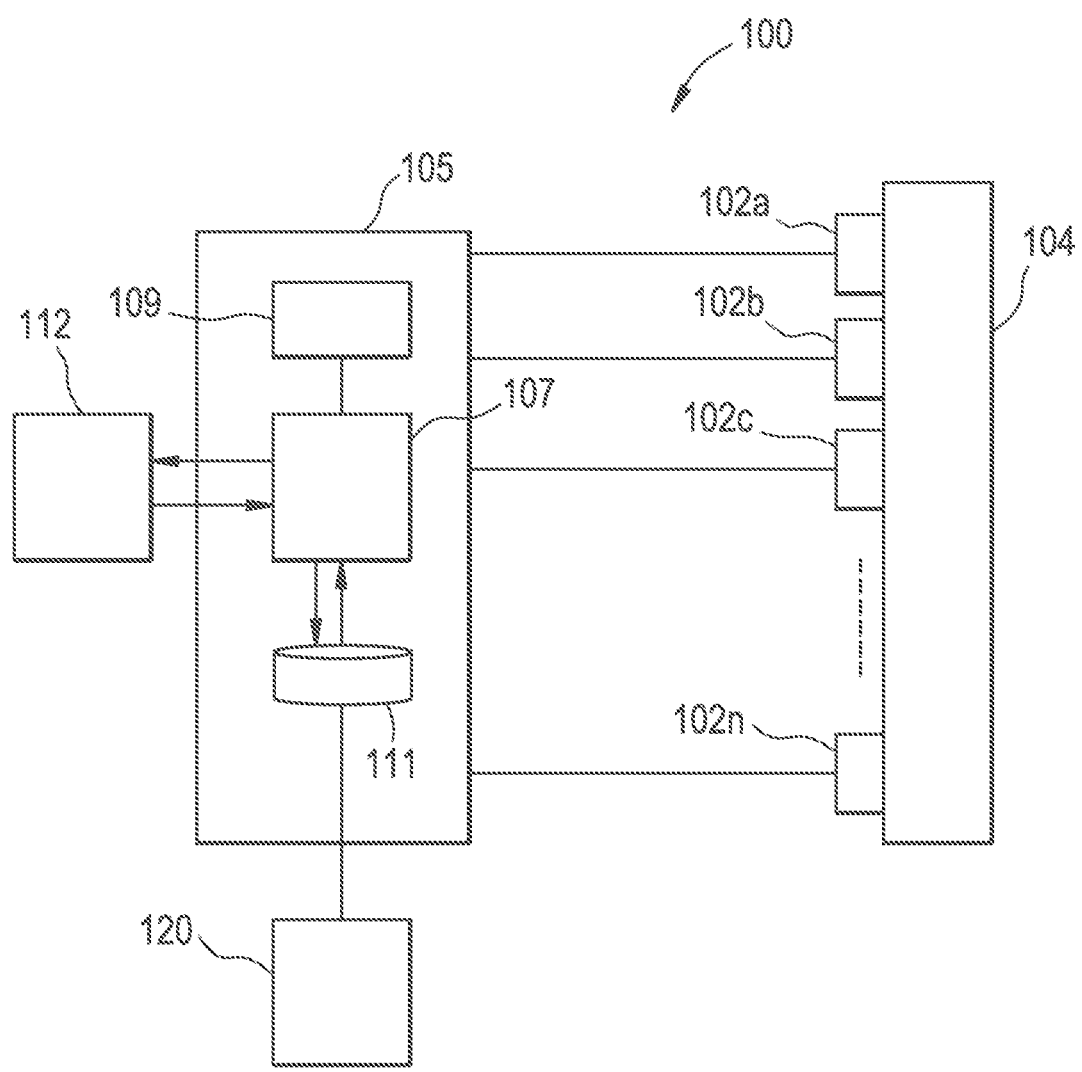
FIG. 1 shows a schematic diagram of an exemplary alarm system that may provide an alarm related to an operating unit or system.

FIG. 1 shows a schematic diagram of an exemplary alarm system 100 that may generate an alarm related to an operating a power plant 104. While the disclosure is discussed with respect to a power plant, in alternate embodiment, the alarm system by be used with any suitable system or machine. The exemplary alarm system 100 includes a plurality of sensors 102a-102n that is coupled to various components of the power plant 104. In the exemplary embodiment of a power plant system, these components may include a gas turbine generator, including compressor section, combustor and turbine section, a power grid, a heating and/or cooling unit, etc. Exemplary operating parameters of the power plant may include a pressure, a switch position, a rotation rate, a temperature, a fuel consumption rate or any other parameters suitable for operation of the power plant. The plurality of sensors 102a-102n may be coupled to control system 105. A selected sensor such as sensor 102a may send a signal to the control system 105 when an operating parameter monitored by the sensor falls outside of a preselected range. In an exemplary operation of the power plant 104, the number of sensors 102a-102n may number in the hundreds or even thousands which may generate a corresponding number of alarms during the operation of the power plant 104.

The control system 105 may include a processor 107 that runs a set of programs 109 suitable for operation of the alarm system 100. The processor 107 may be in communication with a user interface 112 and with a database or memory 111. In an exemplary embodiment, the processor 107 receives a signal or an alarm from at least one of the sensors 102a-102n, processes the signal or alarm to determine an alarm state, and presents the alarm state to a user interface 112 along with a corresponding rating system. An operator at the interface 112 may dynamically rate the alarm state. The processor 107 may further receive a rating value related to the alarm state from the user interface 112 and store the rating value in the memory 111. In an exemplary embodiment, the memory 111 may store a plurality of rating values corresponding to a selected alarm state. The processor 107 may access the plurality of alarm rating values and perform an evaluation or analysis of the selected rating to determine a relevance of the alarm towards operation of the power plant 104. The memory 111 may further be accessible to one or more developers 120 that may use the ratings stored therein to perform several operations. For example, the developers 120 may alter a presentation of a selected alarm state to the operator at the interface 112 based on the rating value corresponding to the selected alarm, for instance, by changing a program setting or parameter related to the alarm. Also, the developers may alter an operation of the power plant 104 or an operation of the alarm system 100 or to alter sensors 102a-102n, such as by removing a sensor, adding a sensor, changing a placement of a sensor, changing a sensitivity or alarm threshold of a sensor, etc.

Figure 2:
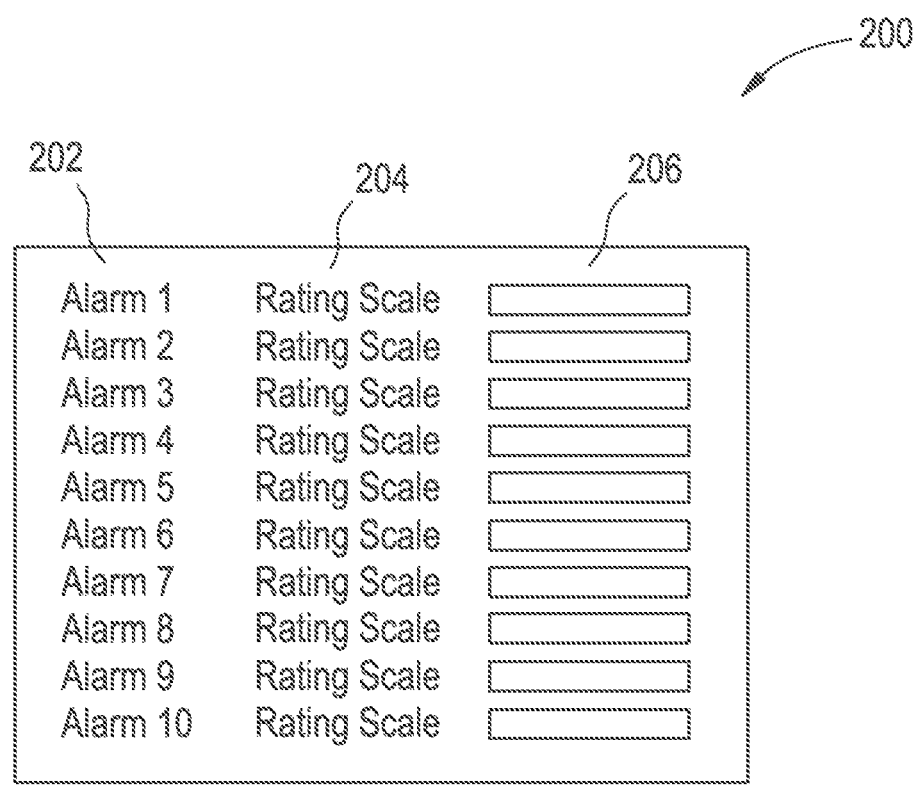
FIG. 2 shows an exemplary display that may be presented to an operator at the user interface of the control system.

FIG. 2 shows an exemplary display 200 that may be presented to an operator at the user interface 112 of the control system 105. The exemplary display 200 includes a plurality of columns 202, 204 and 206 related to alarm parameters. A first column 202 or set of columns may present the alarm entry to the operator indicating the alarm type, alarm identification, power plant component and other informative data. A second column 204 provides a rating system for the operator. The rating system may be a graduated scale, such as a scale ranging between two numeric limits such as from 1 to 10 or from 1 to 5, for example. Alternatively, the rating system may be a Boolean rating system, wherein the operator may select one of two values, i.e., YES/NO, +/−, relevant/not relevant, etc. In an exemplary embodiment, the operator receives the alarm and rates the alarm dynamically, i.e., during a response to the alarm or during acknowledgement of the alarm. In general, the operator rates the alarm based on a perceived urgency of the alarm or a relevance of the alarm to the operation of the power plant 104. In one aspect, the interface 112 allows the operator to acknowledge the alarm and rate the alarm simultaneously. For example, the operator may select "Acknowledge +" to simultaneously acknowledge the alarm and to provide a positive rating value for the alarm. Similarly, the operator may select "Acknowledge −" to simultaneously acknowledge the alarm and to provide a negative rating value for the alarm. Additionally, the alarm system may obtain the rating value from the operator before allowing the operator to perform an action related to the alarm. A third column 206 includes one or more text boxes corresponding to the alarms in column 204 that allow the operator to provide comments with respect to a rating value and/or explaining the selected rating value.

In one embodiment, the alarms may be prioritized, filtered or sorted at the user interface based on the rating values of the alarms, which may be based on the accumulated rating each alarm has received during prior acknowledgements. Additionally, the processor 107 may be used to sort out irrelevant alarms based on prior rating values. For example, the processor 107 may sort out an alarm that is rated below a selected level on the graduated scale, such as a rating less than 3.

The present disclosure therefore provides a method for collecting quantitative data from operators about each alarm. The data may then be used when designing controls for future power plants or to eliminate the recurrence of alarms deemed to be a nuisance or of little value, incorrect timing, etc. without changing an underlying alarm code.

FIG. 3 shows a system 300 of power plant facilities that may operate using the exemplary alarm system disclosed herein. In an exemplary embodiment, the power plant facilities 302a-302n are separate facilities. Each power plant facility may have its own alarm system. In the exemplary system 300, alarm rating values obtained at the plurality of power plant facilities 302a-302n are aggregated at common memory location 305. The common memory location 305 may be accessible to one or more developers. The one or more developers may use the aggregated rating values to performing various operations at the plurality of power plants 302a-302n. In an exemplary embodiment, the developers may determine which alarms may be modified for the power plant facilities as well as which alarms may be modified at a particular power plant facility.

FIG. 4 shows a flowchart illustrating an exemplary method of responding to an alarm at a power plant facility. In Block 402, an operator receives an alarm generated by a sensor that is related to operation of a power plant facility. In Block 404, the operator rates the alarm during acknowledgement of the alarm or while taking an action with respect to the alarm. In Block 406, a plurality of rating values for the alarm is compiled in a database. In Block 408, these compiled rating values are used to alter an operation of the alarm system or of the power plant facility, such as changing a presentation of the alarm at the user interface, changing a sensitivity of a sensor, changing an operation of the power plant facility, etc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dynamic alarm system for operating a plant, comprising:
    a sensor configured to generate a signal related to a measurement of an operation of the plant;
    an interface configured to display a generated alarm to an operator and receive from the operator a dynamic rating value related to a relevance of the generated alarm to operation of the plant; and
    a processor configured to:
        generate the alarm at the interface using the generated signal;
        compile the rating value, and
        alter an operation of the plant from the compiled rating value.

2. The dynamic alarm system of claim 1, wherein the interface is further configured to enable the operator to acknowledge and rate the alarm simultaneously.

3. The dynamic alarm system of claim 1 wherein the processor is further configured to compile the rating value for a plurality of plants.

4. The dynamic alarm system of claim 1, wherein the interface is further configured to alter a subsequent presentation of the alarm at the interface based on the compiled rating value of the alarm.

5. The dynamic alarm system of claim 1, wherein the interface is further configured to allow the operator to provide a comment.

6. The dynamic alarm system of claim 1, wherein the rating value is at least one of: (a) a Boolean value; and (b) a value selected from a graduated scale.

7. A method of responding to an alarm at a power plant, comprising:
    receiving one or more alarms related to an operation of the power plant;
    dynamically rating the one or more alarms by an operator of the power plant to obtain one or more rating values related to a relevance of the one or more alarms to operation of the plant;
    compiling the one or more rating values;
    determining a relevance of a selected alarm to the operation of the power plant from the compiled rating values; and altering an operation of the power plant using the determined relevance.

8. The method of claim 7, wherein dynamically rating an alarm selected from the one or more alarms further comprises selecting a rating value as part of a response to the alarm.

9. The method of claim 7, further comprising using the determined relevance of the alarm to alter a parameter of a sensor that generates the alarm.

10. The method of claim 7 further comprising compiling the one or more rating values for a plurality of power plants.

11. The method of claim 7, organizing a presentation of the one or more alarms based on the compiled one or more rating values of the one or more alarms.

12. The method of claim 7, wherein dynamically rating the one or more alarms further comprises providing a comment.

13. The method of claim 7, wherein rating the one or more alarms further comprises selecting at least one of: (a) a Boolean value; and (b) a value from a graduated scale.

14. An apparatus for responding to an alarm at a plant, comprising
- a control panel configured to receive one or more alarms related to an operation of the plant;
- an interface configured to receive from an operator a dynamically selected rating value related to a relevance of the one or more alarms to operation of the power plant; and
- a processor configured to:
  - compile the dynamically selected rating values, and
  - determine a relevance of a selected alarm to operation of the plant from the compiled rating values, and
  - alter an operation of the plant from the determined relevance.

15. The apparatus of claim 14, wherein the interface is further configured to receive the dynamically selected rating value from an operator prior to allowing the operator to respond to the one or more alarms.

16. The apparatus of claim 14, further comprising a sensor configured to monitor the plant and generate an alarm.

17. The apparatus of claim 14 wherein the processor is further configured to compile rating values for a plurality of plants.

18. The apparatus of claim 14, wherein the interface is further configured to alter a presentation of the one or more alarms at the interface based on the compiled rating values of the one or more alarms.

19. The apparatus of claim 14, wherein the interface is further configured to allow an operator to provide a comment.

20. The apparatus of claim 14, wherein the rating value is at least one of: (a) a Boolean value; and (b) a value selected from a graduated scale.

* * * * *